INVENTOR.
TED W. BERWIN
BY Marvin Moody
ATTORNEY

Dec. 25, 1956 T. W. BERWIN 2,775,693

PULSE AMPLITUDE SELECTOR

Filed Feb. 25, 1953 3 Sheets-Sheet 2

INVENTOR.
TED W. BERWIN
BY Marvin Moody
ATTORNEY

Dec. 25, 1956 T. W. BERWIN 2,775,693

PULSE AMPLITUDE SELECTOR

Filed Feb. 25, 1953 3 Sheets-Sheet 3

INVENTOR.
TED W. BERWIN
BY [signature]
ATTORNEY

United States Patent Office 2,775,693

Patented Dec. 25, 1956

2,775,693

PULSE AMPLITUDE SELECTOR

Ted W. Berwin, Encino, Calif., assignor to Collins Radio Company, Cedar Rapids, Iowa, a corporation of Iowa Application February 25, 1953, Serial No. 338,792

9 Claims. (Cl. 250—27)

This invention relates in general to a signal level detector and in particular to means for determining which one of a plurality of signals has the largest amplitude.

It is oftentimes desirable in electronics to determine which one of a plurality of incoming signals has the largest amplitude. For example, in diversity type receivers the message may be sent in a time or frequency diversity scheme, and it is desirable to determine at the receiver which of the incoming signals has the largest amplitude.

It is an object of the present invention to indicate and determine which one of a plurality of incoming signals has the largest amplitude.

Another object of this invention is to provide means for selecting the correct input signal.

Still another object of this invention is to provide means for separating one signal from a number of other signals.

A feature of the invention is found in the provision for a common biasing circuit connected to amplifier tubes, each of which receives a different input signal such that the first tube to start conducting will continue to conduct and prevent the remaining amplifier tubes from conducting.

Further objects, features and advantages will become apparent from the following description and claims when read in view of the drawings, in which:

Figure 1:
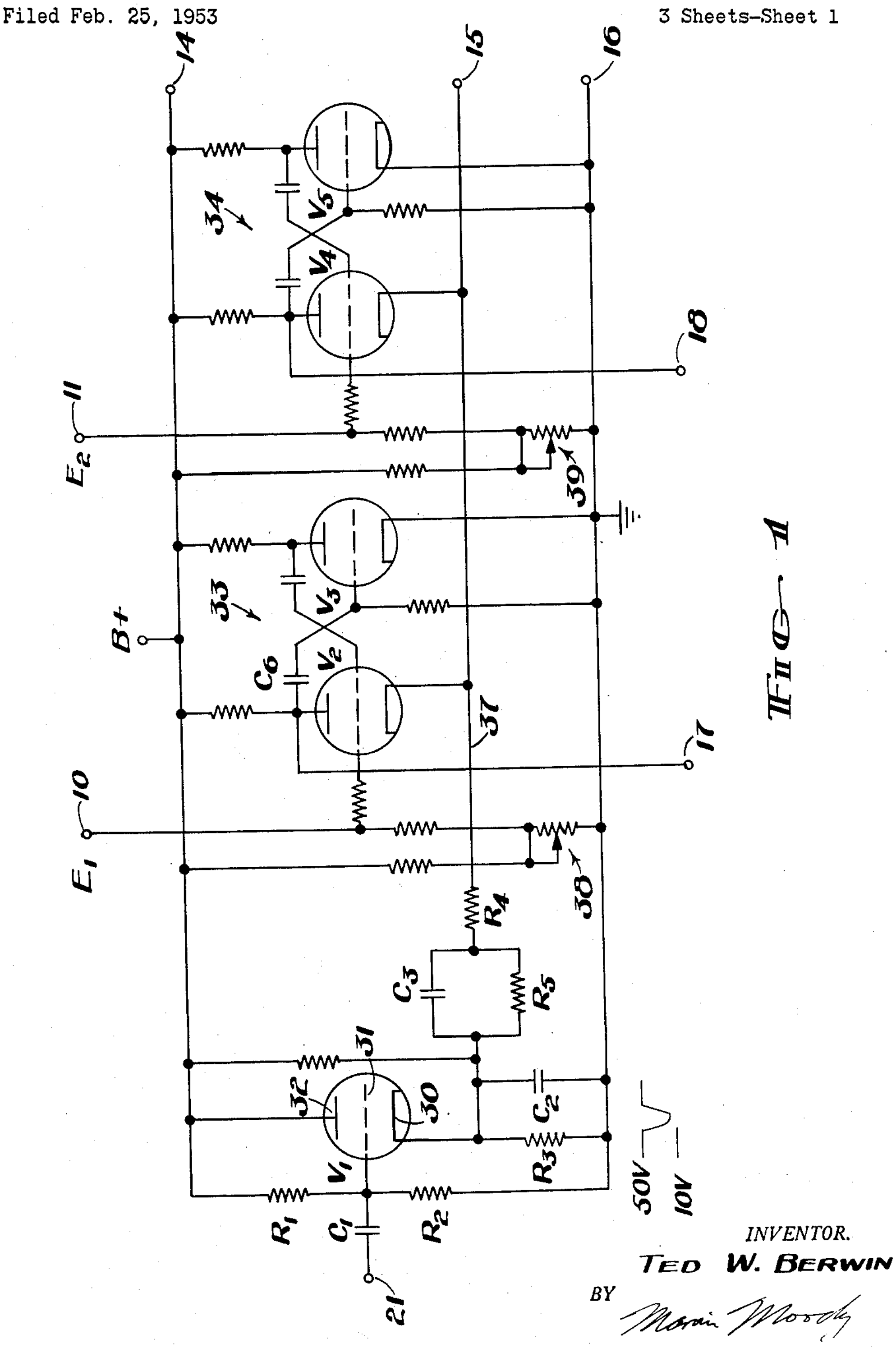
Figure 1 is a partial schematic of the diversity selector of this invention.
Figure 2:
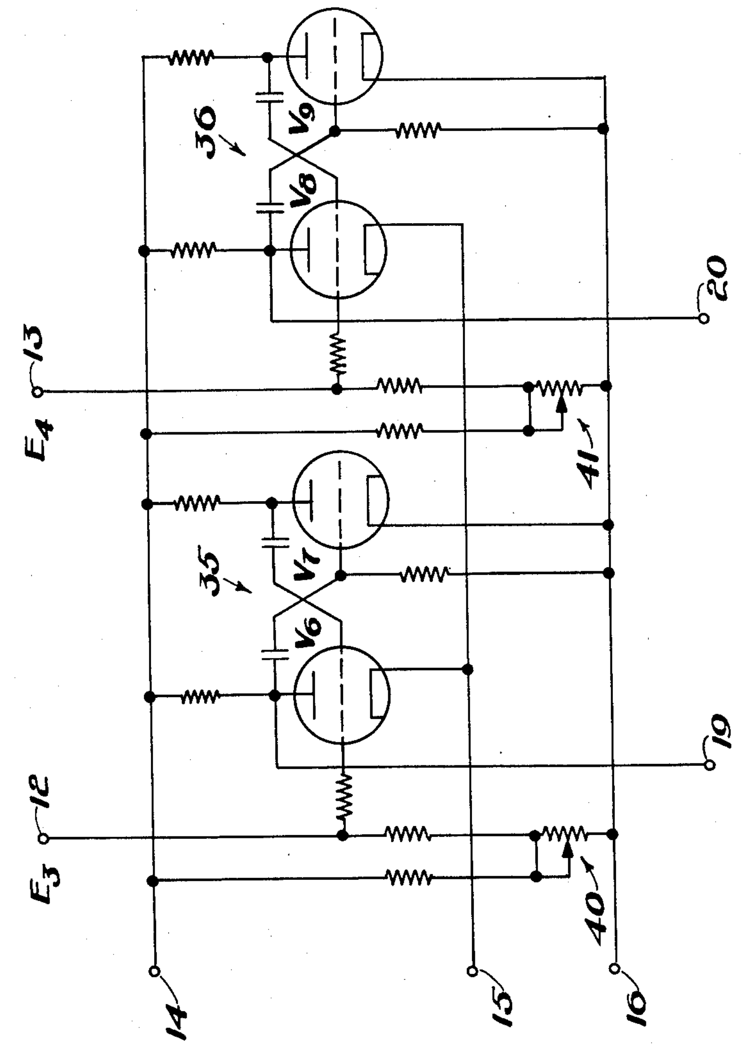
Figure 2 is the remainder of the electrical schematic of the diversity selector according to this invention.

Referring to Figures 1 and 2, let it be assumed that terminals 10, 11, 12 and 13 each receive a different input signal and let it also be assumed that terminals 14, 15 and 16 are connected together in the two figures.

Figure 4:
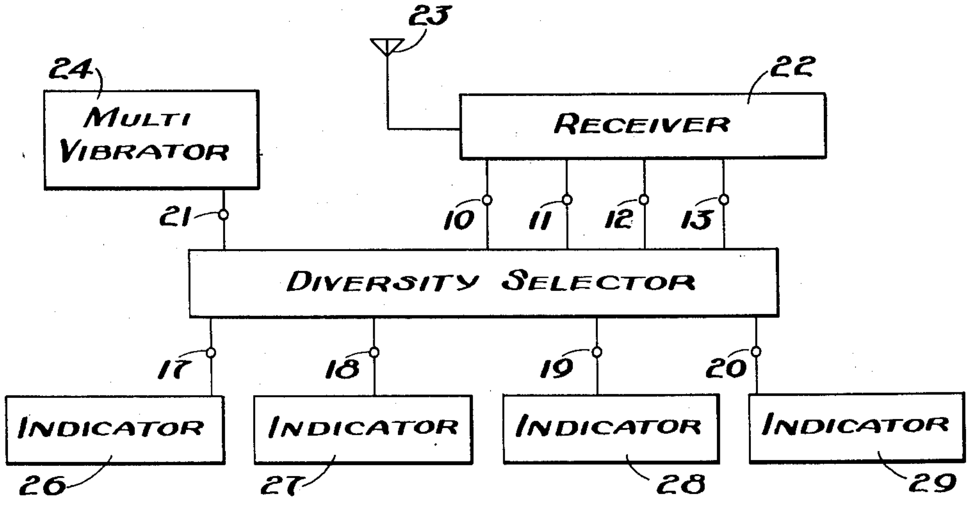
Figure 4 illustrates the general problem with the diversity selector in use.

Four output terminals 17, 18, 19 and 20 are provided and an input terminal 21 is also provided. Figure 4 illustrates a receiver 22 which has an antenna 23. It is assumed that the receiver 22 produces four outputs and it is desired to determine which of the four outputs has the largest amplitude. The outputs from the receiver are connected, respectively, to input terminals 10, 11, 12 and 13 of the diversity selector. A multivibrator 24 supplies an input to terminal 21 of the diversity selector. The output terminals 17, 18, 19 and 20 are connected, respectively, to indicators 26, 27, 28 and 29.

Referring to Figures 1 and 2, the multivibrator terminal 21 is connected to a condenser $C_1$ which is connected to a control grid 31 of a tube $V_1$. The plate 32 is connected to B plus and the cathode 30 is connected to a resistor $R_3$ which has its opposite side connected to ground. A condenser $C_2$ is connected across resistor $R_3$.

Each of the input signals connected to terminals 10, 11, 12 and 13 are connected, respectively, to trigger circuits designated generally as 33, 34, 35 and 36. The cathodes of one half of the tubes of each trigger circuit, viz., $V_3$, $V_5$, $V_7$ and $V_9$ are connected to ground and the cathodes of the other half of the tubes of the trigger circuits, $V_2$, $V_4$, $V_6$ and $V_8$ are connected together by a common lead 37 which is connected to a resistor $R_4$ and a parallel circuit comprising $C_3$ and $R_5$. The opposite sides of $C_3$ and $R_5$ are connected to the cathode 30 of tube $V_1$.

Output terminal 17 is connected to the plate of tube $V_2$. The output terminal 18 is connected to the plate of tube $V_4$, and output terminals 19 and 20 are connected, respectively, to the plates of tubes $V_6$ and $V_8$. The input terminals 10, 11, 12 and 13 are coupled, respectively, to the control grids of tubes $V_2$, $V_4$, $V_6$ and $V_8$. Adjustable biasing potentiometers 38, 39, 40 and 41 are connected between ground and the input terminals.

Figure 3:
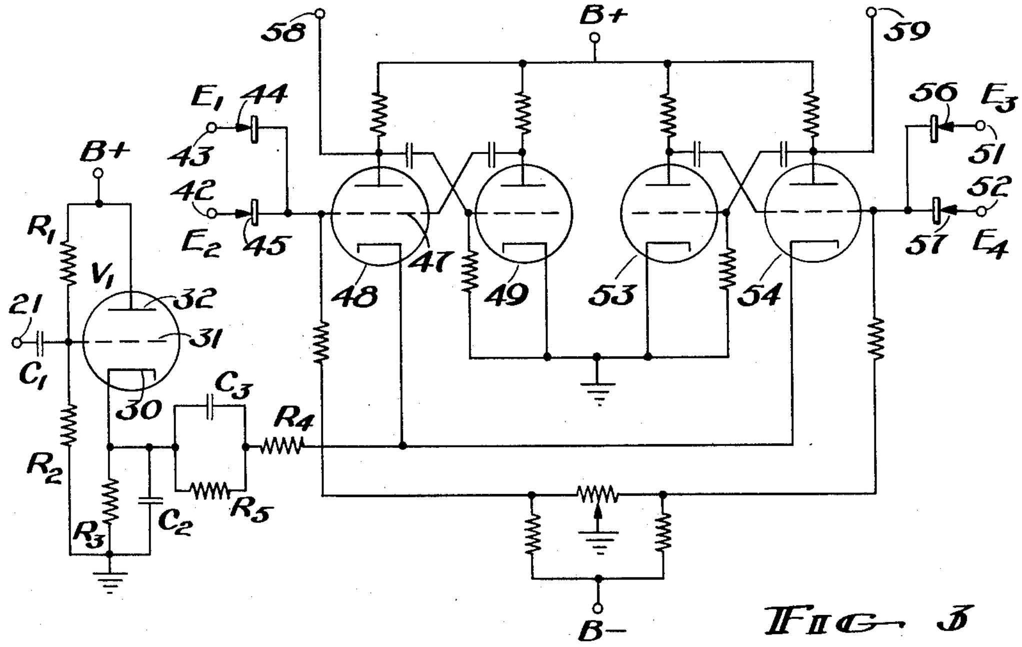
Figure 3 is a schematic of a modification of the invention.

Figure 3 illustrates a modification which may be used in the event that two of the incoming signals are "marks" and two are "spaces." In this circuit the number of diversity tubes has been cut in half and it is necessary only for the circuit to determine whether the incoming signal is a "mark" or a "space."

The two "mark" channels are connected to terminals 42 and 43 and fed through diode rectifiers 44 and 45 to the control grid 47 of a trigger circuit comprising tubes 48 and 49.

Likewise, the two "space" signals are connected to input terminals 51 and 52 and supplied to the control grid of a second trigger circuit having tubes 53 and 54 through the diode rectifiers 56 and 57. The outputs are removed from terminals 58 and 59.

In operation, the circuit shown in Figures 1 and 2 receives a negative pulse from the multivibrator 24 on terminal 21 which might have the duration of 1,000 micro-seconds. This negative pulse will cause tube $V_1$ which normally conducts to be driven to cut-off and the voltage across $R_3$ will drop from its normal value of 50 volts exponentially to 10 volts, for example. In other words, when the tube $V_1$ is conducting, the resistor $R_3$ might have a positive voltage of 50 volts across it but when it is cut off, it will drop exponentially to 10 volts.

The wave shape across resistor $R_3$ is shown in Figure 1. This signal is transferred through the resistors $R_4$ and $R_5$ to the cathodes of tubes $V_2$, $V_4$, $V_6$ and $V_8$ and acts as a bias on these tubes. The incoming signals $E_1$, $E_2$, $E_3$ and $E_4$ are connected to the terminals 10 through 13 and subtract from the total bias on each of the tubes.

Thus, if tubes $V_2$, $V_4$, $V_6$ and $V_8$ have a bias equal, respectively, to $(E_1-E_{R_3})$, $(E_2-E_{R_3})$, $(E_3-E_{R_3})$, and $(E_4-E_{R_3})$, when the total bias on any of the tubes drops down to a predetermined value, as for example, minus 10 volts, that tube will conduct. For example, let us assume that $E_1$ is larger than $E_2$, $E_3$ or $E_4$. The bias on $V_2$ will gradually drop from $(E_1-50)$ when $E_{R_3}$ is 50 volts, to $(E_1-10)$ when $E_{R_3}$ is 10 volts. The total bias on tube $V_2$ will drop to a conducting voltage which might be minus 10 volts sooner than will the bias on tubes $V_4$, $V_6$, $V_8$ because $E_1$ is greater than $E_2$, $E_3$ or $E_4$.

Therefore $V_2$ will be the first tube to conduct and when it conducts the voltage on its plate will drop. This drop will be couplied by the condenser $C_6$ to the grid of tube $V_3$, thus producing a regenerative action to cause tube $V_2$ to become fully conducting almost instantaneously. When tube $V_2$ conducts it will draw cathode current, thus increasing the bias on tubes $V_4$, $V_6$ and $V_8$ so that they cannot possibly conduct. The result is that a negative pulse will appear at terminal 17 indicating that $E_1$ was the largest of all four input signals.

The tube $V_1$ and its related circuitry forms a one-shot multivibrator and will return to its normally conducting state in about 100 microseconds.

The potentiometers 38, 39, 40 and 41 allow the tubes to be adjusted so that they have the proper bias.

Thus, a negative pulse will occur at the output terminals 17 through 20, indicating which of the incoming pulses has the largest amplitude. Once one of the tubes $V_2$ through $V_8$ has started to conduct, the others are cut off and it will be the only one to conduct. The indicators 26 through 29 will respond to the negative pulse.

The apparatus of Figure 3 operates in substantially the same way, except only one of two outputs is produced since there are two "mark" signals and two "space" signals.

It is seen that this invention provides means for choosing the signal of largest amplitude from a plurality of incoming signals.

Although it has been described with respect to a preferred embodiment thereof, it is not to be so limited as changes and modifications may be made therein which are within the full intended scope of the invention, as defined by the appended claims.

I claim:

1. Means for detecting which one of a plurality of incoming signals has the largest amplitude comprising, a plurality of trigger circuits, each receiving one of the input signals, each of said trigger circuits comprising a pair of tubes with the cathodes of one of said tubes connected to ground and the cathodes of the other tubes connected together, the input signals connected to the control grids of the other tubes, a one-shot multi-vibrator, a cathode resistor connected in the circuit of said one-shot multivibrator, a cathode condenser connected in parallel with said cathode resistor, and said cathode resistor coupled to the cathodes of said other tube.

2. A diversity selector for determining which one of a plurality of incoming signals has the largest amplitude comprising, a one-shot multi-vibrator receiving a triggering pulse each time a determination is to be made, a multivibrator tube, a cathode resistor and condenser connected in parallel and between the cathode of said multi-vibrator tube and ground, a plurality of trigger circuits comprising a pair of electron tubes, one of said electron tubes in each of said trigger circuits coupled to the cathode of the multivibrator tube, a plurality of output terminals connected, respectively, to the plates of the other tubes of said trigger circuits and one of said output terminals receiving an output to indicate which of the input signals has the largest amplitude.

3. A diversity selector for determining which one of a plurality of input signals has the largest amplitude comprising, a one-shot multi-vibrator having an electron tube, a cathode resistor and condenser connected in parallel between the cathode of said electron tube and ground, the control grid of said one-shot multi-vibrator tube receiving a triggering impulse periodically so as to bias it to cut-off, a plurality of trigger circuits corresponding to the number of input signals, an input signal coupled to each of said trigger circuits, an output terminal connected to each of said trigger circuits to indicate which of the inputs had the greatest amplitude, and the cathode of said multi-vibrator coupled to said trigger circuits.

4. Apparatus for determining which of a plurality of signals has the largest amplitude comprising, a receiving means producing a plurality of signals, a diversity selector receiving said plurality of signals, a multi-vibrator supplying an input to said diversity selector, a plurality of indicators connected to said diversity selector, and said diversity selector comprising a plurality of trigger circuits each connected, respectively, to the plurality of outputs of said receiver, the outputs of said plurality of trigger circuits connected, respectively, to said indicators, a one-shot multi-vibrator forming a part of said diversity selector and connected to the output of said multi-vibrator, an electron tube forming a part of said one-shot multivibrator, a cathode resistor and condenser conncted in parallel between ground and the cathode of said electron tube, the cathode of said electron tube connected to each trigger circuit, and said indicators connected to the trigger circuits.

5. A diversity selector for determining which one of a plurality of input signals has the largest amplitude comprising, a one-shot multi-vibrator having an electron tube, a cathode resistor and condenser connected in parallel between the cathode of said electron tube and ground, the control grid of said one-shot multi-vibrator tube receiving a triggering impulse periodically so as to bias it to cut-off, a plurality of trigger circuits corresponding to the number of input signals, an input signal coupled to each of said trigger circuits, an output terminal connected to each of said trigger circuits, a plurality of potentiometers connected to said trigger circuits, and the cathode of said multi-vibrator coupled to said trigger circuits.

6. A diversity selector for determining which one of a plurality of input signals has the largest amplitude comprising, a one-shot multi-vibrator having an electron tube, a cathode resistor and condenser connected in parallel between the cathode of said electron tube and ground, the control grid of said electron tube receiving a triggering impulse periodically so as to bias it to cut-off, a plurality of trigger circuits corresponding to the number of input signals, an input signal coupled to each of said trigger circuits, an output terminal connected to each of said trigger circuits to indicate which of the inputs had the greatest amplitude, and the cathode of said electron tube coupled to said trigger circuits.

7. A diversity selector for determining which one of a plurality of input signals has the largest amplitude comprising, a one-shot multi-vibrator having an electron tube, a cathode resistor and condenser connected in parallel between the cathode of said electron tube and ground the control grid of said one-shot multi-vibrator tube receiving a triggering impulse periodically so as to bias it to cut-off, a pair of trigger circuits corresponding to the number of input signals, an input signal coupled to each of said trigger circuits, an output terminal connected to both of said trigger circuits to indicate which of the inputs had the greatest amplitude, and the cathode of said multivibrator tube coupled to said trigger circuits.

8. A diversity selector for determining which one of a plurality of input signals has the largest amplitude comprising, a one-shot multi-vibrator having an electron tube, a cathode resistor and condenser connected in parallel between the cathode of said electron tube and ground, the control grid of said one-shot multi-vibrator tube receiving a triggering impulse periodically so as to bias it to cut off, four trigger circuits, an input signal coupled to each of said trigger circuits, an output terminal connected to each of said trigger circuits to indicate which of the inputs had the greatest amplitude, and the cathode of said multivibrator tube coupled to said trigger circuits.

9. A diversity selector for determining which one of four input signals has the largest amplitude comprising, a one-shot multi-vibrator having an electron tube, a cathode resistor and condenser connected in parallel between the cathode of said electron tube and ground, the control grid of said one-shot multi-vibrator tube receiving a triggering impulse periodically so as to bias it to cut-off, a pair of trigger circuits corresponding to the number of input signals, an input signal coupled to each of said trigger circuits, an output terminal connected to each of said trigger circuits to indicate which of the inputs had the greatest amplitude, and the cathode of said multi-vibrator tube coupled to said trigger circuits.

References Cited in the file of this patent

UNITED STATES PATENTS

| | | |
|---|---|---|
| 2,449,848 | Hefele | Sept. 21, 1948 |
| 2,560,600 | Schafer | July 17, 1951 |
| 2,617,931 | Trousdale | Nov. 11, 1952 |